United States Patent [19]

Ishikawa et al.

[11] 4,258,643
[45] Mar. 31, 1981

[54] ILLUMINATED INDICATOR GAUGE WITH ILLUMINATED POINTER

[75] Inventors: Masao Ishikawa, Yokohama; Kenji Nakamura, Yokosuka; Akio Ajimine, Tokyo, all of Japan

[73] Assignee: Nissan Motor Company, Limited, Yokohama, Japan

[21] Appl. No.: 46,643

[22] Filed: Jun. 8, 1979

[30] Foreign Application Priority Data

Jun. 21, 1978 [JP] Japan ............................ 53-84057[U]

[51] Int. Cl.³ ............................................ G01D 11/28
[52] U.S. Cl. .......................... 116/286; 116/DIG. 36; 362/26
[58] Field of Search ............... 116/286, 288, 287, 332; 362/30, 26

[56] References Cited

U.S. PATENT DOCUMENTS

| | | | |
|---|---|---|---|
| 2,287,605 | 6/1942 | Dickson et al. | 116/287 |
| 2,712,593 | 7/1955 | Merchant | 116/287 X |
| 2,761,056 | 8/1956 | Lazo | 362/26 |
| 2,900,949 | 8/1959 | Baker | 116/288 |
| 2,914,021 | 11/1959 | Blackwell et al. | 116/286 |
| 3,033,155 | 5/1962 | Beckman | 116/288 |

Primary Examiner—Daniel M. Yasich

[57] ABSTRACT

A light guiding plate integral with a dial board proper of a transparent material is formed with a light reflecting surface which is such constructed that the light entering the light guiding plate from a top of the same is reflected by the light reflecting surface to be directed toward a portion, where the light guiding plate and the dial board proper are integrally connected, for focalization of the light in the vicinity of an opening of the dial board proper through which a spindle of a movement passes.

7 Claims, 6 Drawing Figures

ILLUMINATED INDICATOR GAUGE WITH ILLUMINATED POINTER

FIELD OF THE INVENTION

The present invention relates in general to an illuminated indicator gauge such as illuminated speedometer or tachometer for a motor vehicle, and more particularly to such a gauge having an illuminated pointer.

BACKGROUND OF THE INVENTION

In illuminated indicator gauges of nowadays, there is a gauge of a type wherein a pointer of a transparent material is illuminated internally or from within by light rays which come thereto from light sources, traveling through the dial board and reflecting on a light reflecting surface located adjacent an opening of the dial board through which a spindle of a movement passes. However, in such type gauges, utilization of the light from the light sources for the internal illumination of the pointer has not been made effectively due to lack of ideal configuration of the light reflecting surface. Thus, illumination effect on the pointer has been poor.

SUMMARY OF THE INVENTION

It is therefore an essential object of the present invention to provide an illuminated indicator gauge in which the light from the light source is effectively used for illumination of a pointer.

It is another object of the present invention to provide an illuminated indicator gauge which is characterized by enhanced illumination effect on the pointer.

Other objects and advantages of the present invention will become clear from the following description when taken in conjunction with the accompanying drawings.

DESCRIPTION OF THE EMBODIMENTS

Figure 1:
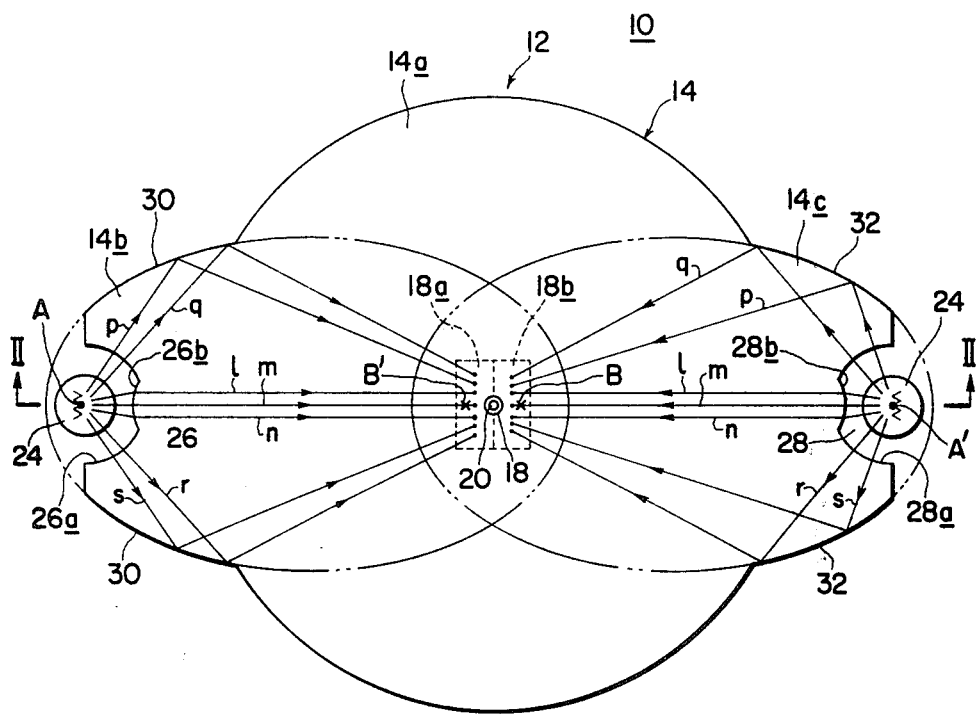
FIG. 1 is a plan view of an essential part of the illuminated indicator gauge of the first embodiment of the invention, both the pointer and the graduated plate being not shown for easy understanding of the essential part.
Figure 2:
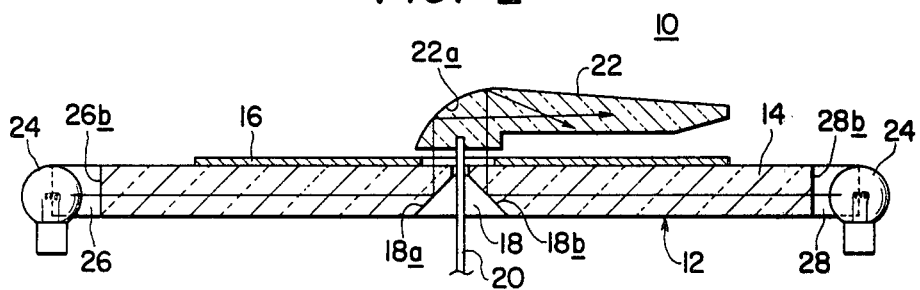
FIG. 2 is a sectional view taken along the line II—II of FIG. 1.

Referring to FIGS. 1 and 2, there is illustrated a first embodiment of the present invention, which is an indicator gauge 10. The gauge 10 generally comprises a dial board 12 made of a transparent plate 14 of even thickness with a top layer of a graduated plate 16 (see FIG. 2). The dial board 12 is formed at the central portion thereof with an opening 18 through which a spindle 20 extending from a movement (not shown) of the gauge 10 spacedly passes. A pointer 22 (see FIG. 2) made of a transparent material is mounted at its hub section on the leading end of the spindle 20 so as to move over the face of the dial board 12 in response to rotation of the spindle 20 about the axis thereof. Two lamps 24 are located at laterally opposite positions with respect to the central portion of the dial board 12.

In addition to the above, the following measures are used in the invention. As is seen from FIG. 1, the transparent plate 14 consists of a main rounded section 14a and two light guiding plate sections or laterally projecting rounded sections 14b and 14c, the sections 14b and 14c being positioned symmetrically with respect to the opening 18 of the dial board 12. Each of these projecting rounded sections 14b and 14c is formed at the top thereof with a rounded recess 26 or 28 which is sized to spacedly receive therein one of the lamps 24. The surface 26a or 28a by which the recess 26 or 28 is bounded forms a part of a cylindrical surface of a cylinder of which longitudinal axis passes through or at least near the center "A" or "A'" of the light source proper of each lamp 24 perpendicularly to the face of the dial board 12. At the bottom of each recess 26 or 28, a convex surface 26b or 28b is provided which is constructed to permit the light rays coming thereto from the lamp 24 to travel parallelly in the transparent plate 14 toward the opening 18 in a manner as is indicated by lines "1", "m" and "n". Further, the peripheral surfaces 30 or 32 of each rounded section 14b or 14c except where the recess 26 or 28 is located are so shaped as to form parts of a curved surface of an elliptic cylinder the cross-section of which has its focuses at the point "A" and the point "B" or "A'" and "B'", the points "B" and "B'" being positioned in the vicinity of the opening 18, the focus "B" being for the ellipse corresponding to the surface 30, while the focus "B'" being for the ellipse corresponding to the surface 32. The opening 18 is enlarged at the inboard section thereof to form a generally trigonal prism-shaped chamber which is bounded by two slanted flat (or first light reflecting) surfaces 18a and 18b. Each surface 18a or 18b is inclined about 45 degrees with respect to an imaginary plane which includes the axis of the spindle 20 and is perpendicular to an imaginary line passing through the centers "A" and "A'" of the lamps 24. It should be noted that the point "B" is located within the surface 18b, while the point "B'" within the surface 18a. As is understood from FIG. 2, the graduated plate 16 is not applied to a portion of the plate 14 where the opening 18 is located. The hub section of the pointer 22 is formed on its outboard side with a curved (or second) light reflecting surface 22a which is constructed to reflect the light coming thereto from the slanted surfaces 18a and 18b toward the top section of the pointer 22 for internal illumination of the same.

With the above-stated construction, among the light rays emitted from the lamps 24, the light rays, such as the ones designated by references "1", "m" and "n", which are directed toward the center of the plate 14 enter the plate 14 through the convex surfaces 26b and 28b and travel in the plate 14 parallelly toward the slanted surfaces 18a and 18b of the opening 18. On the contrary, the light rays, such as ones designated by references "p", "q", "r" and "s", which deviate widely from the direction toward the center of the plate 14 enter the plate 14 through the round surface 26a and 28a and travel toward the round peripheral (or third light reflecting) surfaces 30 and 32. It should be now noted that almost all light rays coming to the surfaces 26a and 28a from the lamps 24 can enter the plate 14 without being reflected or refracted at the surface 26a and 28a since, as has been mentioned before, each of these surfaces is formed to constitute a part of a cylindrical surface of which axis passes through or at least near the point "A" or "A'" perpendicularly to the face of the plate 14. The light rays coming to the surfaces 30 and 32 are then reflected thereon to be directed toward the focuses "B" and "B'". The light rays "1", "m", "n", "p", "q", "r" and "s" which are thus directed toward the opening 18 of the plate 14 are then reflected on the slanted surfaces 18a and 18b to be directed toward the hub section of the pointer 22, as is understood from FIG. 2. The light rays entering the hub section are then reflected on the curved surface 22a to be directed toward the top of the pointer 22 for illumination of the same from within. It should be thus noted that the light rays produced by the lamps 24 are highly efficiently used for illumination of the pointer 22, thus illumination of the pointer 22 is much enhanced in comparison with that of the conventional illuminated indicator gauge.

Figure 3:
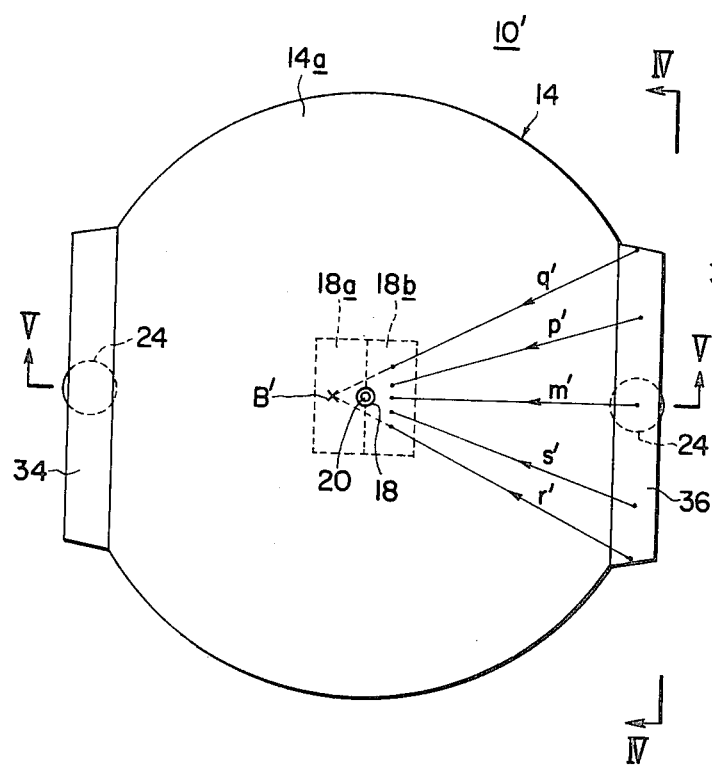
FIG. 3 is a view similar to FIG. 1, but shows the second embodiment of the invention.
Figure 4:
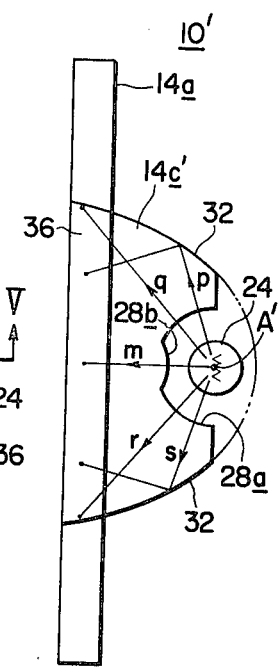
FIG. 4 is a side view taken from the direction of IV—IV of FIG. 3.
Figure 5:
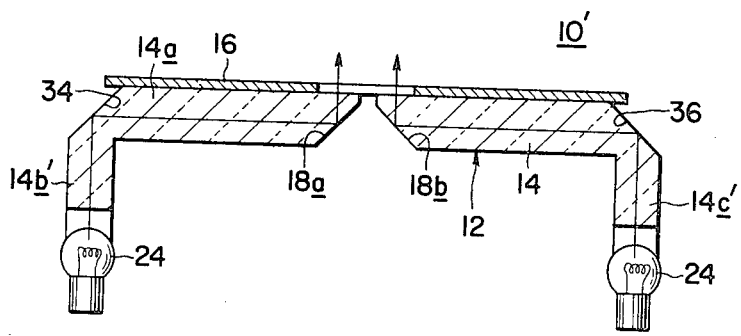
FIG. 5 is a sectional view taken along the line V—V of FIG. 3.

Referring to FIGS. 3 to 5, there is illustrated a second embodiment of the invention. In the indicator gauge 10' of this embodiment, two bent round sections 14b' and 14c' are formed on lateral sides of the main rounded section 14a as a substitute for the laterally projecting rounded sections 14b and 14c of the first embodiment of FIGS. 1 and 2. The rounded sections 14b' and 14c' extend perpendicularly with respect to the face of the transparent plate 14 of the dial board 12. At the connecting portions where the rounded sections 14b' and 14c' are integrally jointed with the main rounded section 14a, slanted flat surfaces (or fourth light reflecting surfaces) 34 and 36 formed each having the inclination of about 45 degrees with respect to the surface of the main rounded section 14a of the dial board 12. Other portions and parts of this embodiment are constructed in the same way as in the case of the first embodiment, thus the explanation of those will be omitted and those are designated by the same reference numerals as in the first embodiment.

With the above-stated construction, the light rays which are emitted from the lamps 24 enter the rounded sections 14b' and 14c' taking such travelling courses as indicated by the lines "p", "q", "m", "r" and "s" in FIG. 4. The light rays are then reflected by the slanted flat surfaces 34 and 36 to be directed toward the opening 18 in the manner as is indicated by the lines "q'", "p'", "m'", "s'" and "r'" in FIG. 3, that is substantially in the same manner as in the case of first embodiment. Thus, effective illumination of the pointer by such light rays is made also in this second embodiment. In this embodiment, compactness of the indicator gauge is accomplished because the lateral size of the dial board 12 can be made small.

Figure 6:
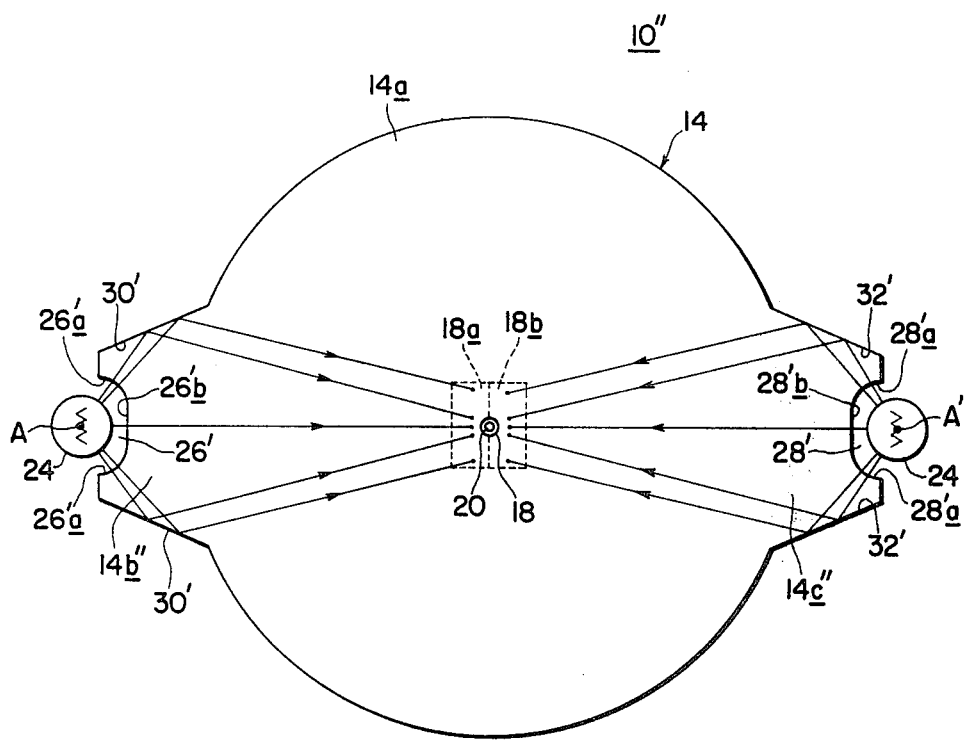
FIG. 6 is a view similar to FIG. 1, but shows a third embodiment of the invention.

Referring to FIG. 6, there is illustrated a third embodiment of the invention. The gauge 10" of this embodiment is similar to that of the first embodiment except the configuration of the laterally projecting sections formed on the transparent plate 14 of the dial board 12. As shown in the drawing, each of the projecting sections 14b" and 14c" is formed at its top thereof with a recess 26' or 28'. The surface by which each recess 26' or 28' is bounded consists of parts 26'a or 28'a of a cylindrical surface of a cylinder of which axis passes through or at least near the point "A" or "A'" perpendicularly to the face of the plate 14, and a flat surface 26'b or 28'b which is perpendicular to an imaginary plane including the axis of the spindle 20 and the points "A" and "A'". Further, the peripheral surfaces 30' or 32' corresponding to the surfaces 30 or 32 of the first embodiment are flat. Of course, the inclination angle of each surface 30' or 32' should be such chosen that the light rays from the lamp 24 will reach the reflection surface 18b or 18a as much as possible.

Although the above-mentioned embodiments show the cases wherein two lamps are employed, one, three or more lamps can be employed by slightly modifying each embodiments.

Thus, according to the present invention, effective utilization of the light from the light sources is accomplished, thereby enhancing the internal illumination effect of the pointer.

What is claimed is:
1. An illuminated indicator gauge comprising:
    a transparent plate having a face and having an opening formed therethrough;
    a spindle passing through said opening of said transparent plate and being rotatable about an axis;
    a pointer of a transparent material having a hub section connected to said spindle to move over the face of said transparent plate in response to rotation of the spindle about said axis and having a pointing section;
    at least one light guiding plate of a transparent material integrally connected to a peripheral edge portion of said transparent plate, said light guiding plate having an end portion spaced a distance from said peripheral edge portion of the transparent plate with a round recess having a bottom;
    a light source spacedly located in said round recess for producing a light which travels within said light guiding plate, said transparent plate and said pointer for the illumination of both said transparent plate and said pointer from within;
    at least one first light reflecting surface formed on a wall by which the opening of said transparent plate is bounded, said first light reflecting surface reflecting the light coming thereto toward said hub section of said pointer;
    a second light reflecting surface formed on the hub section of said pointer for reflecting the light from said first light reflecting surface toward the pointing section of the pointer;
    third light reflecting surfaces formed on a peripheral edge section of said light guiding plate, said third light reflecting surfaces being so formed to reflect the light which enters the light guiding plate through said round recess toward the integrally connected portion where said light guiding plate and said transparent plate are integrally connected, for focussing the light at the first light reflecting surface; and
    a convex surface formed on the bottom of said round recess to constitute a convex lens so that the light rays coming thereto from said light source can travel parallelly within said light guiding plate toward said first light reflecting surface of said transparent plate.

2. An illuminated indicator gauge as claimed in claim 1, in which said light source has a center and in which a surface by which said round recess is bounded forms partly a cylindrical surface of a cylinder of which the longitudinal axis passes through the center of said light source perpendicularly to the face of said light guiding plate.

3. An illuminated indicator gauge as claimed in claim 2, in which said light guiding plate is arranged to laterally outwardly extend from said transparent plate so that the face of said light guiding plate is flush with the face of said transparent plate.

4. An illuminated indicator gauge as claimed in claim 3, in which said third light reflecting surfaces are constructed to form a part of a curved surface of an elliptic cylinder or which the cross-section has one focus at the center of said light source and the other focus in the vicinity of said opening.

5. An illuminated indicator gauge as claimed in claim 2, in which said light guiding plate is arranged to be perpendicular to said transparent plate so that the face of said light guiding plate is normal to the face of said transparent plate.

6. An illuminated indicator gauge as claimed in claim 5, in which the integrally connected portion where said light guiding plate and said transparent plate are integrally connected is formed with a fourth light reflecting surface by which the light coming thereto from the light source is reflected toward said first light reflecting surface.

7. An illuminated indicator gauge comprising: a transparent plate having a face and having an opening formed therethrough; a spindle passing through said opening and being rotatable about an axis; a pointer of a transparent material having a hub section connected to said spindle to move over the face of said transparent plate in response to rotation of the spindle about said axis; at least one light guiding plate of a transparent material integrally connected to a peripheral edge portion of said transparent plate, said light guiding plate having a face and an end portion a spaced distance from said peripheral edge portion of the transparent plate with a round recess within which a light source with a center is spacedly located, the surface by which said round recess is bounded forming partly a cylindrical surface of a cylinder of which the longitudinal axis passes through the center of said light source perpendicularly to the face of said light guiding plate, said light guiding plate being arranged to be perpendicular to said transparent plate so that the face of said light guiding plate is normal to the face of said transparent plate, said light source being adapted to produce light which travels within said light guiding plate, said transparent plate and said pointer for the illumination of both said transparent plate and said pointer from within; at least one first light reflecting surface formed on a wall by which said opening of said transparent plate is bounded, said first light reflecting surface reflecting the light coming thereto toward said hub section of said pointer; a second light reflecting surface formed on the hub section of said pointer for reflecting the light from said first light reflecting surface toward the pointing section of the pointer; third light reflecting surfaces formed on a peripheral edge section of said light guiding plate, said third light reflecting surfaces being so formed to reflect the light which enters the light guiding plate through said round recess toward the integrally connected portion where said light guiding plate and said transparent plate are integrally connected; a fourth light reflecting surface formed on said integrally connected portion for reflecting the light coming thereto toward said first light reflecting surface for focussing the light at the first light reflecting surface and a convex surface formed on the bottom of said round recess to constitute a convex lens so that the light rays coming thereto from said light source can travel parallelly within said light guiding plate toward said first light reflecting surface of said transparent plate.

* * * * *